United States Patent [19]
Clemons

[11] Patent Number: 5,940,254
[45] Date of Patent: Aug. 17, 1999

[54] INVERTED CROWNING OF DATA CARTRIDGE CORNER ROLLS

[75] Inventor: Gregory Ray Clemons, Dothan, Ala.

[73] Assignees: Sony Corporation, Tokyo, Japan; Sony Electronics, Inc., Park Ridge, N.J.

[21] Appl. No.: 08/883,499

[22] Filed: Jun. 26, 1997

[51] Int. Cl.$^6$ ............................................. G11B 23/087
[52] U.S. Cl. ................................................ 360/132
[58] Field of Search .................. 360/132; 242/352.4; 226/190, 193

[56] References Cited

U.S. PATENT DOCUMENTS

| | | | |
|---|---|---|---|
| 5,415,361 | 5/1995 | Sato | 242/352.4 |
| 5,416,659 | 5/1995 | Saitou et al. | 360/132 |
| 5,421,259 | 6/1995 | Shiba et al. | 226/193 |
| 5,501,386 | 3/1996 | Kobayshi | 226/190 |
| 5,515,216 | 5/1996 | Saitou et al. | 360/132 |
| 5,559,655 | 9/1996 | Saitou et al. | 360/132 |

*Primary Examiner*—Robert S. Tupper
*Attorney, Agent, or Firm*—Ronald P. Kananen

[57] ABSTRACT

A corner roller for guiding a tape recording/reproducing medium in a tape cartridge having a body defining an axially extending bore and an undulating circumferential surface. The undulating circumferential surface has an inverted radius for contacting a drive belt in a tape cartridge. The circumferential surface of the body defines a pair of opposed end portions and a center portion having about the same diameter d1, in which the center portion is respectively separated from the end portions by a pair of spaced intermediate portions, each having a diameter d2 less than the diameter d1 of the end and center portions. The circumferential surface in profile defines a surface which is a smooth surface of revolution axially traversing from a first diameter d1 to a second smaller diameter d2 to a middle portion having about the first diameter d1, then to another portion having a smaller diameter d2 merging with an end portion 66 having a larger diameter d1.

9 Claims, 2 Drawing Sheets

INVERTED CROWNING OF DATA CARTRIDGE CORNER ROLLS

BACKGROUND OF THE INVENTION

This invention relates to data cartridges, included but not limited to known QIC, QIC Wide, and Travan data cartridges. More particularly, this invention relates to mechanical, belt to roller tracking of data tapes in data cartridges. Still more particularly, this invention relates to an inverted crowning of the corner rolls in data cartridges to maintain positive belt tracking at high speed or low speed tracking conditions in the cartridge, while maintaining ease of manufacture.

DESCRIPTION OF RELATED ART

Data cartridges are known to the art which contain a data recording medium in the form of a tape traveling between a tape supply reel and a tape takeup reel. The tape travels a fixed path from the tape supply roll about a pair of spaced corner pins to define a tape traveling path. The take up reel is driven by a driver roller assembly having a drive roll for driving a belt about a path engaging the drive roller assembly, a pair of corner rollers and a drive pin.

It is a continuing objective in this art to provide a positive belt tracking system to ensure positive belt tracking at high speed or low speed within the cartridge. In addition, it is desired to provide this feature while recognizing a need for simplified and economical manufacturing processes.

In particular, positive belt drive during periods of transition between high speed and low speed and vice versa has been difficult to achieve with certainty. Thus, another feature of the invention relates to the crowning of the corner rollers to enable the drive belt to avoid a rise or fall of the drive tape from the convex crown of the owner rolls, and to permit use of a narrower belt drive with less inertia.

A typical known belt driven data cartridge useful for implementing the improvement according to the invention is shown in the exploded perspective view of FIG. 1. The cartridge, shown generally by the reference numeral 10, includes a base plate assembly 12, and a cover assembly 14 housing therebetween a recording medium supply and takeup assembly 16, and a belt drive assembly 18.

The base plate assembly 12 includes a base plate 20 having a guide pin 21, a door 22, a door spring 23, a screw 24, a pair of guide pins 25 for guiding recording magnetic tape 26, a pair of pins 27 acting as hubs for a takeup reel 28 having a flange 29 and a recording medium supply reel 30 having a hub (not shown) and a flange 31. The recording magnetic tape 26 is thus provided from the supply reel 30 about the guide pin 25a, then about the guide pin 25b, to the takeup reel 28.

A drive belt 32 travels about a corner roller 33a, and a second corner roller 33b, each of which is respectively rotatably secured about a first and second corner pin 34a and 34b. The drive belt 32 is in driven contact with a drive roller sleeve 35 on a drive roller assembly 36 connected to a spindle (not shown) for driving the belt at a selected high or low speed according to the recording/reproducing mechanism into which the cartridge 10 is inserted. The forward end of the belt 32 path is looped about a drive pin 38.

The cover assembly 42 having a cover 14 includes a file protect member 44 and a light window 47 in register with an end sense mirror 43 when the cover is secured to the base plate 20.

In the cartridge of FIG. 1, it is essential for faithful recording and reproduction that the drive belt 32 be securely in contact with the corner rollers 33a and 33b, especially during transition between high speed and low speed.

FIG. 2 is an enlarged view of the corner rolls 33a and 33b for the cartridge of FIG. 1. Each corner roll includes an axially extending bore 50 formed in a spindle body 51 for engaging the corner pins 34a, 34b respectively. An outer circumferential surface 53 has a pair of end zones 54 having about the same diameter and a center zone having a crown radius 55. The belt thus engages the crown radius and a portion of each of the end zones 54. Such a corner roll has a tendency to permit a belt runoff.

It remains a concern to ensure a stable contact between the belt and the corner roller as indicated above.

SUMMARY OF THE INVENTION

Directed to overcoming problems with the art, it is a first object of this invention to provide an improved profile for a corner roller for the cartridge of FIG. 1 for positive alignment of the drive belt at speed transition.

It is an additional object of the invention to provide a corner roller having an inverted radius for improving contact with the drive belt, especially during transitions between a high drive speed and a low drive speed, while keeping the same outside diameter.

It is still another object of this invention to provide a tape cartridge combination with an improved corner roller.

Accordingly, the invention is directed to a corner roller having an axially extending bore in a roller body merging with a circumferential surface of the corner roller which has an inverted radius. Specifically, the corner roller defines an pair of opposed end portions and a center portion having about the same diameter, in which the center portion is respectively separated from the end portions by a diameter less than the diameter of the end and center portions. Preferably the two intermediate diameters are about the same. In profile, the surface is a smooth surface of revolution traversing from a first diameter to a second smaller diameter to a middle portion having about the first diameter, then to another portion having a smaller diameter merging with an end portion having a larger diameter.

Such a surface profile for the corner roller of the invention provides a centering guide at the larger diameter center portion for the belt in which the smaller diameter portions help guide the drive belt toward the larger diameter center portion.

DETAILED DESCRIPTION OF THE PREFERRED EMBODIMENT

Figure 1:
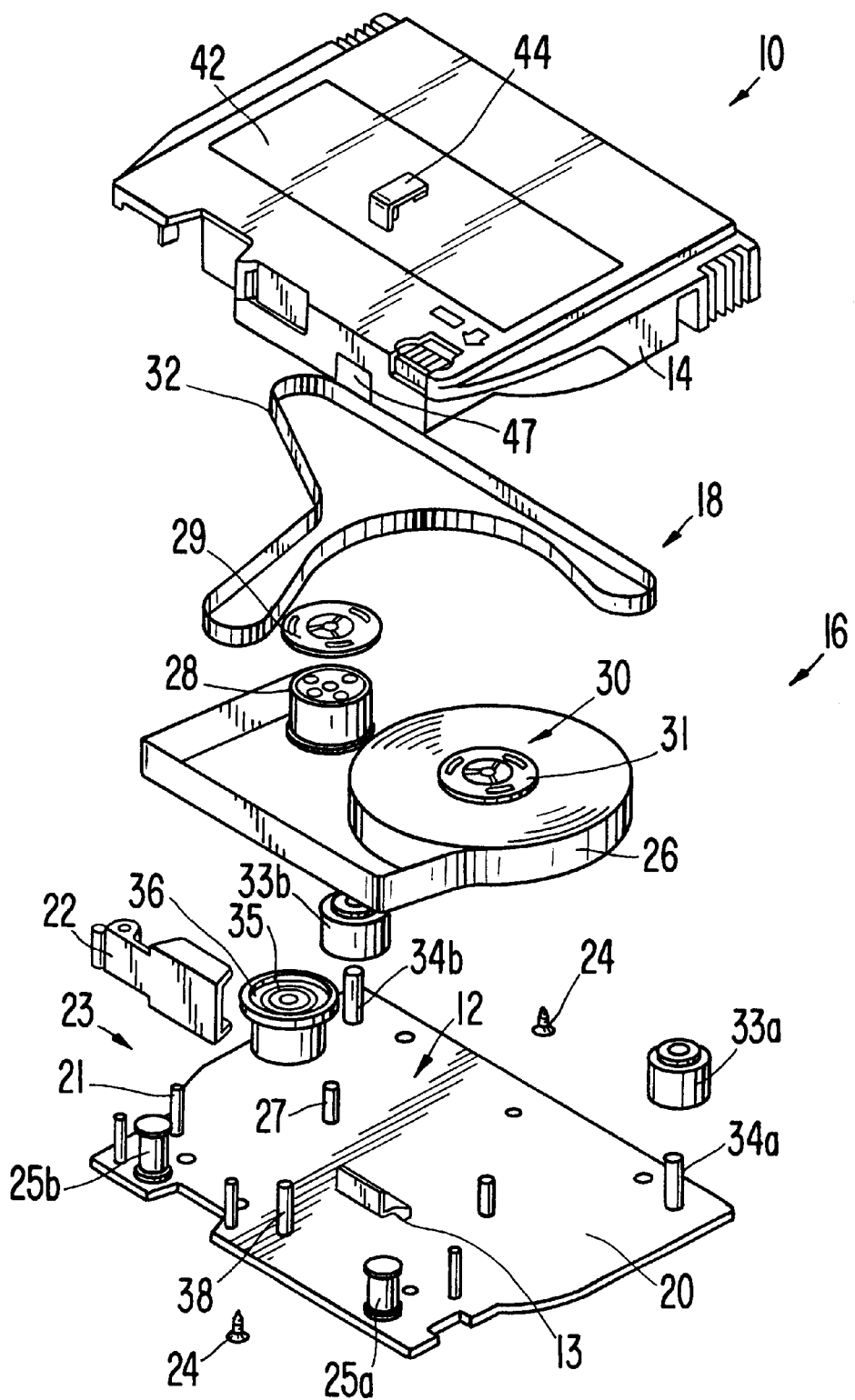
FIG. 1 is a tape cartridge of a type known to the art for guiding a recording/reproducing magnetic tape.
Figure 2:
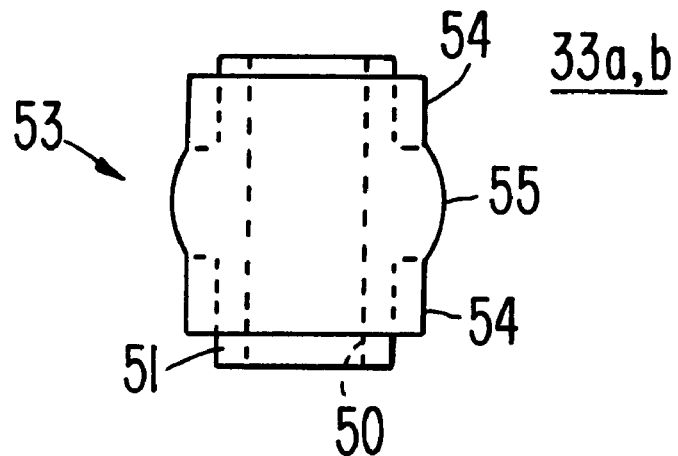
FIG. 2 shows a conventional corner roller of the cartridge of FIG. 1.
Figure 3:
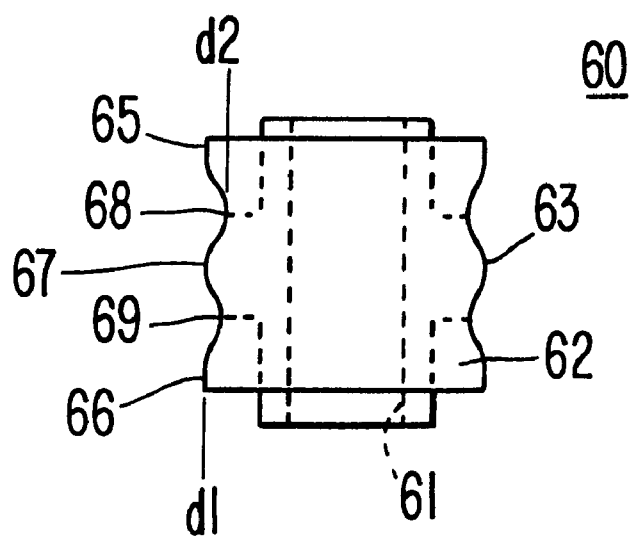
FIG. 3 shows an improved corner roller of the invention.

FIG. 3 shows an improved corner roller 60 of the invention for use with the cartridge of FIG. 1 and as a replacement for the corner rollers 33a, 33b in the cartridge of FIGS. 1 and 2.

The corner roller 60 has an axially extending bore 61 in a roller body 62 merging with an undulating circumferential surface 63 of the corner roller which has an inverted radius. Specifically, the corner roller 60 defines a pair of opposed end portions 65 and 66 and a center portion 67 having about the same diameter d1, in which the center portion 67 is respectively separated from the end portions 65 and 66 by portions 68, 69 each having a diameter d2 less than the diameter d1 of the end and center portions. Preferably the two intermediate diameters are about the same. In profile, the surface is a smooth surface of revolution axially traversing from a first diameter d1 to a second smaller diameter d2 to a middle portion 67 having about the first diameter d1, then to another portion 69 having a smaller diameter d2 merging with an end portion 66 having a larger diameter d1.

Preferably, the corner rollers of the prior art and the invention are made from a suitable plastic material having good wear characteristics.

These and other features of the invention will be seen from the foregoing description as presented in the following claims which are illustrative, it being understood that various modifications of the invention but within the spirit of the invention are proper.

What is claimed is:

1. A corner roller for guiding a drive belt in a tape cartridge, comprising:

a body defining an axially extending bore and a circumferential surface;

said circumferential surface having both convex and concave portions, relative to said axially extending bore, for contacting a drive belt in a tape cartridge wherein said circumferential surface of said body defines a pair of opposed end portions and a center portion having about the same diameter d1, in which the center portion is respectively separated from the end portions by a pair of spaced intermediate portions, each having a diameter d2 less than the diameter d1 of the end and center portions.

2. A corner roller as set forth in claim 1 wherein the two intermediate diameters are about the same.

3. A corner roller for guiding a drive belt in a tape cartridge, comprising:

a body defining an axially extending bore and a circumferential surface;

said circumferential surface having both convex and concave portions, relative to said axially extending bore, for contacting a drive belt in a tape cartridge wherein said circumferential surface in profile defines a surface which is a smooth surface of revolution axially traversing from a first diameter d1 to a second smaller diameter d2 to a middle portion having about the first diameter d1, then to another portion having a smaller diameter d2 merging with an end portion having a larger diameter d1.

4. A corner roller as set forth in claim 3 wherein said portions having a second smaller diameter d2 are more than two.

5. In combination, a tape cartridge comprising:

a housing having a base plate and a cover for containing a type recording/reproducing medium having a path from a supply reel to a takeup reel about at least one guide pin, at least one of said supply reel and said takeup reel being driven by a driving belt guided by at least one corner roller guiding said drive belt in said tape cartridge, said corner roller comprising:

a body defining an axially extending bore and a circumferential surface;

said circumferential surface having both convex and concave portions, relative to said axially extending bore, for contacting a drive belt in a tape cartridge wherein said circumferential surface of said body defines a pair of opposed end portions and a center portion having about the same diameter d1, in which the center portion is respectively separated from the end portions by a pair of spaced intermediate portions, each having a diameter d2 less than the diameter d1 of the end and center portions.

6. A tape cartridge having a corner roller as set forth in claim 5 wherein the two intermediate diameters are about the same.

7. In combination, a tape cartridge forth comprising:

a housing having a base plate and a cover for containing a type recording/reproducing medium having a oath from a supply reel to a takeup reel about at least one guide pin, at least one of said supply reel and said takeup reel being driven by a driving belt guided by at least one corner roller guiding said drive belt in said tape cartridge, said corner roller comprising:

a body defining an axially extending bore and a circumferential surface;

said circumferential surface having both convex and concave portions, relative to said axially extending bore, for contacting a drive belt in a tape cartridge wherein said circumferential surface in profile defines a surface which is a smooth surface of revolution axially traversing from a first diameter d1 to a second smaller diameter d2 to a middle portion having about the first diameter d1, then to another portion having a smaller diameter d2 merging with an end portion having a larger diameter d1.

8. A tape cartridge having a corner roller as set forth in claim 7 wherein said portions having a second smaller diameter d2 are more than two.

9. A tape cartridge as set forth in either of claims 5 or 7 wherein said tape cartridge has a pair of said corner rollers.

* * * * *